(12) United States Patent
Burguera

(10) Patent No.: US 7,786,382 B2
(45) Date of Patent: Aug. 31, 2010

(54) HIGH EFFICIENCY PAIRED PHASES BUSWAY SYSTEM

(76) Inventor: Elio Burguera, 2111 NW. 79 Ave., Miami, FL (US) 33122

( * ) Notice: Subject to any disclaimer, the term of this patent is extended or adjusted under 35 U.S.C. 154(b) by 429 days.

(21) Appl. No.: 11/972,256

(22) Filed: Jan. 10, 2008

(65) Prior Publication Data

US 2009/0178824 A1  Jul. 16, 2009

(51) Int. Cl.
*H02G 5/00* (2006.01)
(52) U.S. Cl. .................. 174/68.2; 174/88 B; 174/99 B; 174/72 B; 439/212; 361/611
(58) Field of Classification Search ............... 174/68.2, 174/72 B, 71 B, 88 B, 99 B, 129 B, 133 B, 174/149 B; 439/210–213; 361/611
See application file for complete search history.

(56) References Cited

U.S. PATENT DOCUMENTS

| | | | | |
|---|---|---|---|---|
| 2,287,502 A | 6/1942 | Togesen et al. | ............. | 307/147 |
| 2,350,601 A | 6/1944 | Frank et al. | ............... | 174/84 R |
| 2,372,267 A | 3/1945 | Frank et al. | ............... | 174/99 B |
| 2,955,147 A | 10/1960 | Carlson | ................. | 174/68.2 |
| 3,044,036 A * | 7/1962 | Herrmann | ................... | 439/114 |
| 3,555,293 A | 1/1971 | Shannon et al. | ............. | 307/147 |
| 3,571,488 A | 3/1971 | Douglass | ................... | 174/68.3 |
| 3,614,297 A | 10/1971 | Carlson | ................... | 174/88 B |
| 3,644,663 A | 2/1972 | Carlson | ................... | 174/88 B |
| 4,008,365 A | 2/1977 | Carlson | ................... | 174/68 B |
| 4,262,163 A | 4/1981 | Durrell et al. | ................. | 174/34 |
| 4,758,172 A | 7/1988 | Richards et al. | ............. | 439/212 |
| 4,804,804 A | 2/1989 | Hibbert et al. | ............. | 174/16.2 |
| 4,945,188 A | 7/1990 | Jackson | ..................... | 174/16.2 |
| 7,091,417 B1 * | 8/2006 | Jur et al. | ..................... | 174/68.2 |
| 7,285,724 B2 * | 10/2007 | Buettner | ................... | 174/70 B |
| 7,557,298 B2 * | 7/2009 | Vanhoutte et al. | .......... | 174/68.2 |

* cited by examiner

*Primary Examiner*—Dhiru R Patel
(74) *Attorney, Agent, or Firm*—Sanchelima & Associates, P.A.

(57) ABSTRACT

A paired phase electrical power distribution bus way system wherein the three phase paired conductors are surrounded and encapsulated by the neutral conductor and packed all together with the housing as a company element to obtain equal separation between the neutral bus bar assembly and the paired phase conductors. The neutral conductor or bus bar assembly consists of two covers that sandwich the three pairs of phase conductors and the insulator layers to achieve minimum and equal distance between them and to reduce and balance the impedance between the neutral and the paired conductors. The housing compresses each pair through the neutral conductor and insulation layer to maintain contact between the conductors, the neutral, and the housing to get efficient heat conduction to the outside.

6 Claims, 4 Drawing Sheets

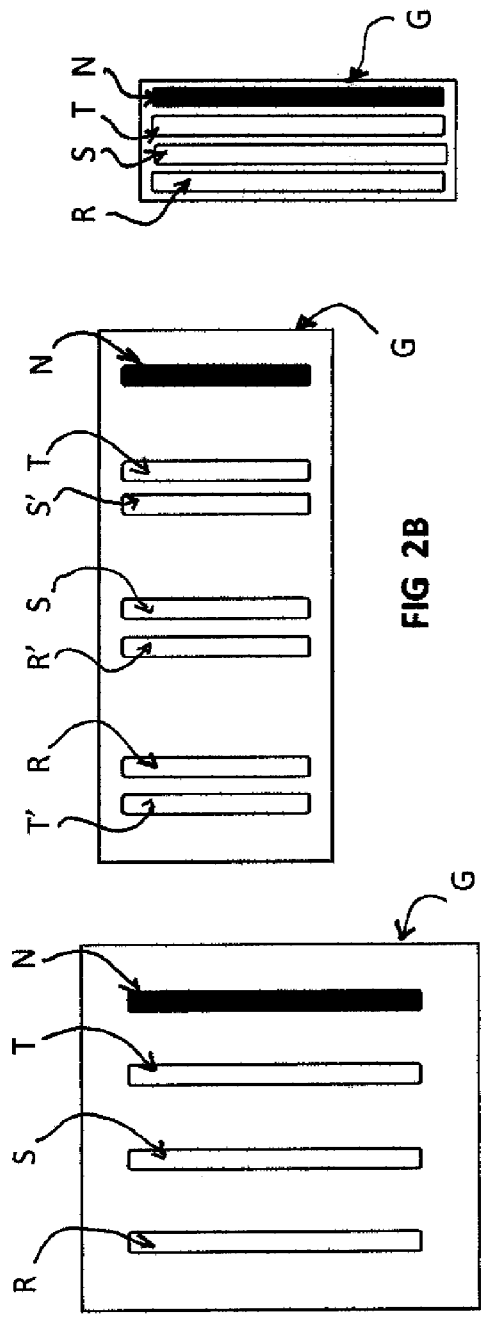
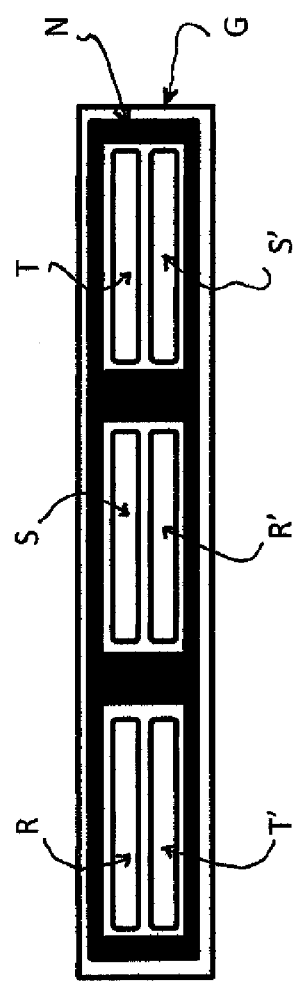
FIG 2A
FIG 2B
PRIOR ART
FIG 2C
FIG 2D
PRESENT INVENTION

HIGH EFFICIENCY PAIRED PHASES BUSWAY SYSTEM

BACKGROUND OF THE INVENTION

1. Field of the Invention

The present invention relates to bus ways for electrical distribution systems, and more particularly, to such systems that include three phases and neutral conductor with paired phase arrangement.

2. Description of the Related Art

It has been well established in the art of designing polyphase (mostly three-phase systems) power distribution systems that the use of bus ways with paired phase arrangements for the bus conductors provides significant advantages in conduction efficiency, reduced impedance and balanced voltage drop for unbalanced loads. For a discussion on the paired phase conductor effect, refer to AIEE 54-329, Cataldo and Shakman paper, attached, where the theory, tests and result of this technology are explained. It has also been well established, that in the modern design of electrical systems, it is a general requirement to include a neutral conductor insulated from ground and that the last standards require the use of 200% current capacity for the neutral bus in cases where harmonical currents are present.

Several designs for bus way systems have been designed in the past. Electrical systems using the paired phase arrangement were described in detail in the U.S. Pat. Nos. 2,287,502, 2,372,267 and 4,008,365, which propose different approaches to obtain designs of bus way systems using the paired phase arrangement for the conductors. These patents propose different options that improve the efficiency, and balance the impedance between the phases using paired phase arrangement, but none of them, however, discloses the encapsulation of each pair with the neutral bus, nor even consider the unbalance impedance between the neutral bus and the phases' conductors. This problem is also present in other commonly used bus way designs, different from the ones that use paired phase arrangements, where unbalanced impedance and unbalanced voltage drops between phases and neutral are frequent. In those cases it's required to use transposition elements in order to compensate the unbalanced voltage drop as was presented in U.S. Pat. No. 4,262,163 issued to Durrell, et al. on Apr. 14, 1981 for a Busway Phase Transposition Assembly.

One of the problems is to topologically arrange the pairs and the neutral bus to obtain balanced impedance and balance voltage drop within phases and neutral conductors in a simple and inexpensive way. As an example of the documentation of the problem, U.S. Pat. No. 2,955,147 issued to Carlson in 1960 is illustrative. The objective of Carlson's patent was to place derivations of the neutral bus in close proximity to every phase, inserting them between the paired buses. Col. 1, lines 62-65. However, this approach is complicated, not compatible with mass production technologies and thermally inefficient.

Another problem is topologically arranging the pairs, the neutral bus and the enclosure in a paired phase system to get the maximal thermal efficiency, the small size and high short circuit capacity of the compact (sandwich type) design, where the bus bars, the duct and the electrical insulation are in intimate contact to provide efficient heat transfer from the bus bars to the enclosure by the way of conduction.

The thermally efficient compact design was described originally in the U.S. Pat. No. 2,350,601 issued to William Frank in 1954, and improved in the U.S. Pat. Nos. 3,555,293, 3,571,488, 3,614,297, 3,644,663, 4,758,172, 4,804,804, 4,945,188 and others, but none of them use the paired phase arrangement in their designs.

Compact (sandwich type) are actually the most common bus way systems used for buildings and general industry, because of their lower cost, compact design and higher short circuit capacity. The paired phase systems are used mostly in particular cases where more efficiency and balanced impedance is required, as in metalwork and automotive industries. Even though the paired phase design provides better technical advantages over the sandwich type, their use is restricted because of their higher cost and non-compact designs.

SUMMARY OF THE INVENTION

It is one of the main objects of the present invention to provide a bus duct for a three phase paired bus way system that maximizes its efficiency by maintaining substantially the same distance to neutral for all phases, in order to get lower and balanced voltage drops all along the line.

It is another objective of this invention to provide an improved paired phase bus way where the neutral, the phase's conductors, the enclosure and the insulators are in intimate contact to provide efficient heat transfer from the bus bars through the neutral to the enclosure by the way of conduction.

It is another object of this invention to provide an improved paired phase bus way where the neutral conductor or bus bar is arranged in a way that it compresses the three pairs of phase's buses in order to obtain a volumetrically efficient design and improved capability of withstanding short circuits.

It is yet another object of this invention to provide such a paired phase bus duct design that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIGS. 2A, 2B and 2C correspond to configurations of prior art bus way arrangements.

FIG. 2D corresponds to the present invention arrangement with encapsulated pairs of paired phase.

DETAILED DESCRIPTION OF THE PREFERRED EMBODIMENT

Figure 1:
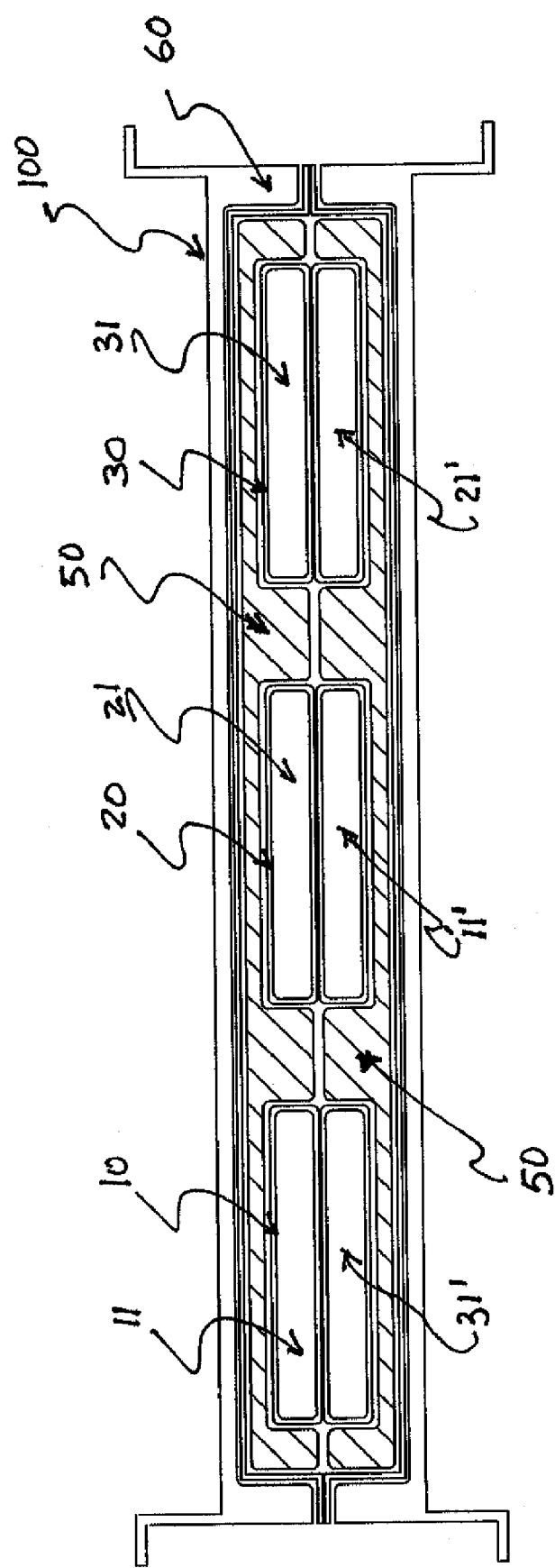
FIG. 1 represents a schematic representation of the paired phase conductors, sandwiched by a neutral bus, in the flatwise configuration.
Figure 3:
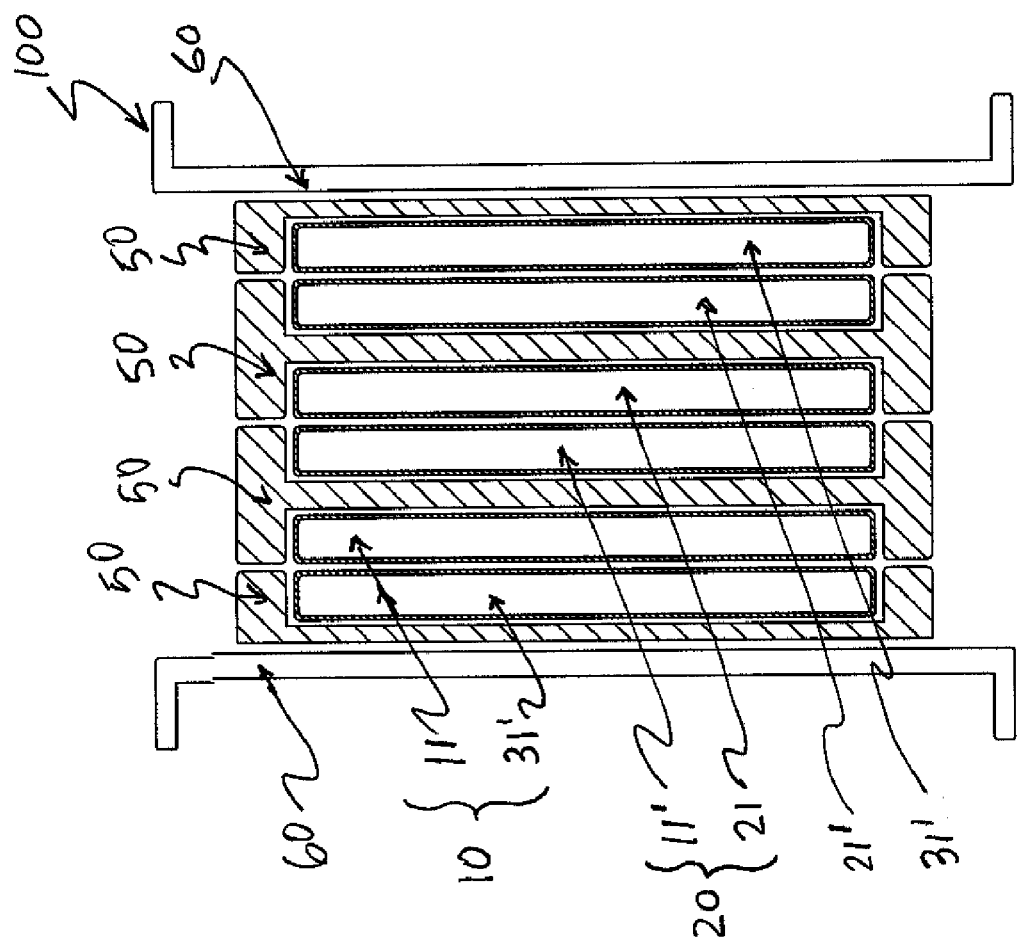
FIG. 3 shows an alternate embodiment for encapsulated pairs of phase paired conductors, in the edge-wise configuration.
Figure 4:
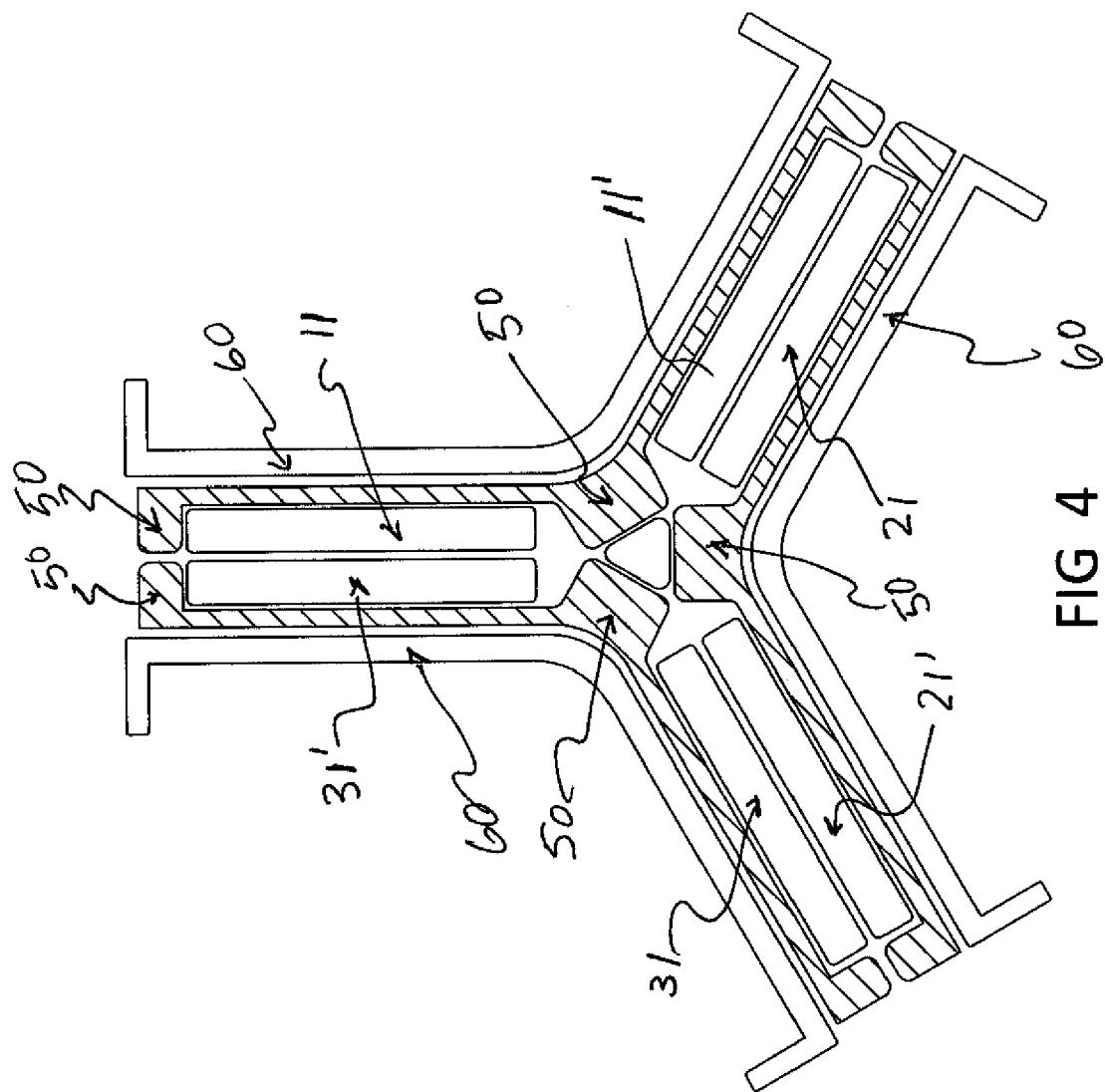
FIG. 4 illustrates yet another embodiment for encapsulated pairs of phase paired conductors, in star configuration.

Referring now to the drawings, where the present invention is generally referred to with numeral 100, it can be observed that it basically includes three pairs, 10; 20 and 30 of flat bar conductors 11; 11'; 21; 21'; 31 and 31', arrangement in a paired phase configuration, as shown in FIG. 1, surrounded and encapsulated by two covers acting as electrical neutral conductor 50, and a housing 60 is an enclosure that acts as ground. The distance between neutral conductor 50 and each one of the pairs 10; 20 and 30 is substantially the same. Achieving this provides for the most efficient utilization of the phase paired conductors effect. The phase conductors and the neutral conductor 50 are insulated with conventional film insulation.

Additionally, in the present invention neutral conductor 50 doubles as part of the heat sinking assembly, which also includes the enclosure or housing 60. Also, the encapsulation results in a mechanically stable structure that withstands the stress introduced by short circuits. Another function of neutral conductor 50 is to shield pairs 10; 20 and 30, reducing the magnetic leakage. The inventor has recorded improved paired phase effects.

In one of the preferred embodiments, neutral conductor 50 includes two substantially identical covers that sandwich the pairs 10; 20 and 30. Pair 10 includes, as shown in FIGS. 1 and 2D, conductor 11 from phase R and conductor 31' from phase T'. Pair 20 includes conductor 21 from phase S and conductor 11' from phase R'. Finally, pair 30 includes conductor 31 from phase T and conductor 21' from phase S'.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A three-phase bus duct section comprising:
   A) first, second and third bus bar pairs; each of said pairs including first and second flat bar conductors kept at a parallel and spaced apart relationship with respect to each other and said first and second flat bar conductors wherein said conductors are connected to achieve paired phase conductor effect, respectively;
   B) neutral bus bar assembly having cooperative dimensions to encapsulate said first, second, and third pairs without being electrically connected; and
   C) housing means supporting said neutral bus bar assembly.

2. The bus duct section set forth in claim 1 wherein a separation between said neutral bus bar assembly and said first, second, and third bus bar pairs is substantially the same.

3. The bus duct section set forth in claim 2 wherein said first and second flat bar conductors have opposing facing surfaces separated by an electrical insulator.

4. The bus duct section set forth in claim 3 wherein said housing means is grounded.

5. The bus duct section set forth in claim 4 wherein said neutral bus bar assembly transmits heat from said flat bar conductors to said housing means so that said heat is dissipated.

6. The bus duct section set forth in claim 5 wherein the encapsulation of said first, second, and third pairs results in a mechanically stable structure to withstand the effects of short circuits.

\* \* \* \* \*